United States Patent
Park et al.

(10) Patent No.: US 10,131,843 B2
(45) Date of Patent: Nov. 20, 2018

(54) VERTICAL ALIGNMENT LAYER COMPRISING CYCLIC OLEFIN COPOLYMER

(71) Applicant: LG Chem, Ltd., Seoul (KR)

(72) Inventors: Eun Seok Park, Daejeon (KR); Jung Ha Park, Daejeon (KR); Dai Seung Choi, Daejeon (KR); Seung Yeon Hwang, Daejeon (KR); Min Hyung Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/519,982

(22) PCT Filed: Dec. 17, 2015

(86) PCT No.: PCT/KR2015/013877
§ 371 (c)(1),
(2) Date: Apr. 18, 2017

(87) PCT Pub. No.: WO2016/099177
PCT Pub. Date: Jun. 23, 2016

(65) Prior Publication Data
US 2017/0349834 A1    Dec. 7, 2017

(30) Foreign Application Priority Data

Dec. 18, 2014 (KR) ................ 10-2014-0183431
Dec. 16, 2015 (KR) ................ 10-2015-0180478

(51) Int. Cl.
*C09K 19/56* (2006.01)
*C08F 232/08* (2006.01)
(Continued)

(52) U.S. Cl.
CPC .............. *C09K 19/56* (2013.01); *C08F 32/08* (2013.01); *C08F 232/08* (2013.01); *C08G 61/08* (2013.01);
(Continued)

(58) Field of Classification Search
USPC ................................. 526/245; 428/1.2
See application file for complete search history.

(56) References Cited

U.S. PATENT DOCUMENTS 4,106,943 A    8/1978    Ikeda et al.
4,571,375 A    2/1986    Benedikt
(Continued)

FOREIGN PATENT DOCUMENTS

JP    H10111569 A    4/1998
JP    2006348115 A    12/2006
(Continued)

OTHER PUBLICATIONS

International Search Report from PCT/KR2015/013877, dated Apr. 1, 2016.
(Continued)

*Primary Examiner* — Mark Kaucher
*Assistant Examiner* — Henry Hu
(74) *Attorney, Agent, or Firm* — Lerner, David, Littenberg, Krumholz & Mentlik, LLP

(57) ABSTRACT

The present invention relates to a vertical alignment layer including a cyclic olefin copolymer, and more specifically, the present invention relates to a vertical alignment layer capable of having alignment even in a low temperature process, and exhibiting excellent liquid crystal vertical alignment by including a cyclic olefin copolymer having a specific substituent.

6 Claims, 1 Drawing Sheet

(51) Int. Cl.
*C08F 32/08* (2006.01)
*C08J 5/18* (2006.01)
*C08L 45/00* (2006.01)
*G02F 1/1337* (2006.01)
*C08G 61/08* (2006.01)

(52) U.S. Cl.
CPC ............... *C08J 5/18* (2013.01); *C08L 45/00* (2013.01); *G02F 1/1337* (2013.01); *G02F 1/133711* (2013.01); *C08G 2261/11* (2013.01); *C08G 2261/122* (2013.01); *C08G 2261/146* (2013.01); *C08G 2261/148* (2013.01); *C08G 2261/1426* (2013.01); *C08G 2261/3324* (2013.01); *C08G 2261/418* (2013.01); *G02F 2001/133742* (2013.01)

(56) References Cited

U.S. PATENT DOCUMENTS

| | | |
|---|---|---|
| 6,027,772 A | 2/2000 | Han |
| 6,727,032 B1 | 4/2004 | Suwa et al. |
| 7,718,744 B2 | 5/2010 | Yoon et al. |
| 7,786,230 B2 | 8/2010 | Yoon et al. |
| 7,786,231 B2 | 8/2010 | Yoon et al. |
| 8,231,946 B2 * | 7/2012 | Yoo ............ C08F 232/08 428/1.2 |
| 8,722,157 B2 * | 5/2014 | Choi ............ C07C 51/567 428/1.1 |
| 2002/0136982 A1 | 9/2002 | Goodall et al. |
| 2005/0010006 A1 | 1/2005 | Chun et al. |
| 2005/0148746 A1 | 7/2005 | Taguchi et al. |
| 2006/0008731 A1 | 1/2006 | Van Der Puy et al. |
| 2006/0159865 A1 | 7/2006 | Kim et al. |
| 2006/0160970 A1 | 7/2006 | Kim et al. |
| 2009/0051858 A1 | 2/2009 | Nakamura et al. |
| 2010/0047481 A1 * | 2/2010 | Choi ............ C07C 51/567 428/1.2 |
| 2010/0076166 A1 | 3/2010 | Kim et al. |
| 2010/0121005 A1 | 5/2010 | Kim et al. |
| 2010/0182547 A1 | 7/2010 | Ryu et al. |
| 2010/0296032 A1 | 11/2010 | Shin et al. |
| 2011/0051050 A1 | 3/2011 | Shin et al. |
| 2011/0063547 A1 | 3/2011 | Takahashi et al. |
| 2011/0213048 A1 | 9/2011 | Yoo et al. |
| 2012/0075560 A1 | 3/2012 | Yoo et al. |
| 2012/0076954 A1 | 3/2012 | Yoo et al. |
| 2014/0199498 A1 | 7/2014 | Shin et al. |

FOREIGN PATENT DOCUMENTS

| | | |
|---|---|---|
| JP | 3962432 B2 | 8/2007 |
| KR | 19980057674 | 9/1998 |
| KR | 20010023940 | 3/2001 |
| KR | 100515595 B1 | 9/2005 |
| KR | 10-0561068 B1 | 3/2006 |
| KR | 100671753 B1 | 1/2007 |
| KR | 100789247 B1 | 1/2008 |
| KR | 20080081731 A | 9/2008 |
| KR | 20090019721 A | 2/2009 |
| KR | 100936868 B1 | 1/2010 |
| KR | 100948708 B1 | 3/2010 |
| KR | 100955569 B1 | 4/2010 |
| KR | 100982394 B1 | 9/2010 |
| KR | 100994977 B1 | 11/2010 |
| KR | 20110033183 A | 3/2011 |
| KR | 101056683 B1 | 8/2011 |
| KR | 101057627 B1 | 8/2011 |
| KR | 101079807 B1 | 11/2011 |
| KR | 101082032 B1 | 11/2011 |
| KR | 20120069652 A | 6/2012 |
| TW | 201240945 A | 10/2012 |
| WO | 99014635 A1 | 3/1999 |
| WO | 2008130186 A2 | 10/2008 |

OTHER PUBLICATIONS

Rehab, Ahmed, "Negative Photoresist Materials Bsaed on Poly(Norbornene Deriviatives-co-styrene-co-maleic Anhydride)." Journal of Macromolecular Science, Part A: Pure and Applied Chemistry, vol. 42, 2005, pp. 327-339.

* cited by examiner

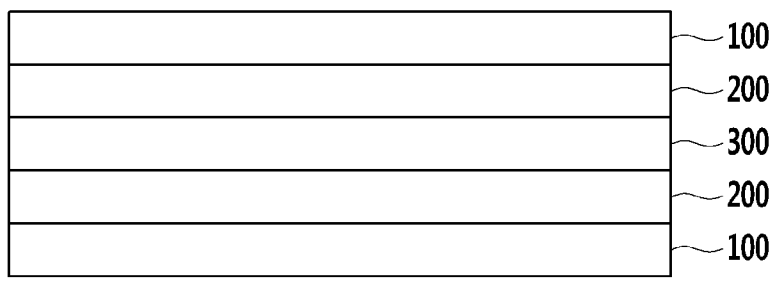

VERTICAL ALIGNMENT LAYER COMPRISING CYCLIC OLEFIN COPOLYMER

CROSS-REFERENCE TO RELATED APPLICATION

The present application is a national phase entry under 35 U.S.C. § 371 of International Application No. PCT/KR2015/013877, filed Dec. 17, 2015, published in Korean, which claims priority from Korean Patent Application No. 10-2014-0183431filed with Korean Intellectual Property Office on Dec. 18, 2014 and Korean Patent Application No. 10-2015-0180478 filed with Korean Intellectual Property Office on Dec. 16, 2015, the disclosures of which are incorporated herein by reference.

BACKGROUND OF THE INVENTION (a) Field of the Invention

The present invention relates to a vertical alignment layer including a cyclic olefin copolymer. More specifically, the present invention relates to a vertical alignment layer capable of having alignment even in a low temperature process and exhibiting excellent liquid crystal vertical alignment by including a cyclic olefin copolymer having a specific substituent.

(b) Description of the Related Art

In accordance with the recent trend of increasing a size of display devices, applications of the large-sized display device are expanding to not only mobile devices such as a smart phone, laptop, etc., but also a large-wall mounted TV, etc. Therefore, the display devices are required to have high-definition, high quality, and a wide viewing angle, etc.

In particular, since a thin film transistor liquid crystal display device (TFT-LCD) which is driven by a thin film transistor is capable of independently driving individual pixels, a response speed of liquid crystal is significantly fast, and accordingly, it is possible to implement high-quality moving images, such that application ranges thereof have been gradually expanded.

In such a TFT-LCD, an alignment layer is used in a lower part of the liquid crystal layer so that a liquid crystal is usable as an optical switch, and the alignment layer includes an alignment copolymer, etc., to be applied to initial alignment of a liquid crystal molecule.

Here, the initial alignment refers to a mechanism in which a main chain of a copolymer is arranged in a predetermined direction, such that liquid crystal molecules are aligned in a state that voltage is not applied.

That is, in order that the liquid crystal is used as the optical switch in the TFT-LCD, the initial alignment of the liquid crystal in the predetermined direction needs to be induced on a layer in which a thin film transistor at the innermost of a display cell is formed. To this end, alignment layers including an alignment copolymer have been used.

Accordingly, in order to more effectively induce the initial alignment, the alignment copolymer included in the alignment layer needs to cause an interaction easily with molecules in the liquid crystal layer.

In general, for the liquid crystal alignment, there is a method of applying a polyamic acid heat resistant polymer onto a transparent glass and performing a heat treatment at a high temperature to form a polyimide polymer alignment layer.

However, since a polymer film substrate is used in the display device applied to a flexible display or a smart window, etc., the above-described method of applying the polyamic acid polymer onto the substrate and performing the heat treatment at a high temperature is not appropriate.

Therefore, a study on a vertical alignment layer capable of having alignment even in a low temperature process and exhibiting excellent liquid crystal alignment is demanded.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a vertical alignment layer having advantages of having alignment even in a low temperature process and exhibiting excellent liquid crystal vertical alignment by including a cyclic olefin copolymer having a specific substituent.

In addition, the present invention has been made in an effort to provide a display device including the vertical alignment layer.

An exemplary embodiment of the present invention provides a vertical alignment layer including a cyclic olefin copolymer represented by Chemical Formula 1 below:

[Chemical Formula 1]

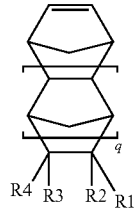

in Chemical Formula 1, q is an integer of 0 to 4, at least one of R1 to R4 is a radical represented by Chemical Formula 1a below, remaining R1 to R4 except for the radical represented by Chemical Formula 1a below are the same as each other or different from each other, and each independently selected from the group consisting of hydrogen; halogen; substituted or unsubstituted C1-C20 linear or branched alkyl; substituted or unsubstituted C2-C20 linear or branched alkenyl; substituted or unsubstituted C2-C20 linear or branched alkynyl; substituted or unsubstituted C3-C12 cycloalkyl; substituted or unsubstituted C6-C40 aryl; substituted or unsubstituted C5-C12 arylalkyl; and a polar functional group including at least one selected from oxygen, nitrogen, phosphorus, sulfur, silicon, and boron, when R1 to R4 are not hydrogen; halogen; or the polar functional group, at least one combination of R1 and R2 or R3 and R4 may be linked to each other to form a C1-C10 alkylidene group, or R1 or R2 may be linked to any one of R3 and R4 to form a C4-C12 saturated or unsaturated aliphatic ring, or a C6-C24 aromatic ring,

[Chemical Formula 1a]

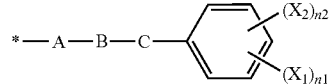

in Chemical Formula 1a,

A and C are each independently a simple bond, or substituted or unsubstituted C1-C5 alkylene, B is ester, n1 and n2 are each independently an integer of 0 to 5, and n1+n2 are an integer of 1 to 5, $X_1$ and $X_2$ are substituents substituted in a benzene ring, and each independently a fluorine atom (F), C1-C5 fluorinated alkyl, C1-C5 fluorinated alkoxy, C6-C20 fluorinated aryl, or C6-C20 fluorinated alkoxyaryl.

In addition, another embodiment of the present invention provides a display device including the vertical alignment layer.

The vertical alignment layer of the present invention may include the cyclic olefin copolymer having a structure in which a specific cyclic substituent is substituted to be capable of exhibiting an improved interaction with liquid crystal molecules even in a low temperature process to thereby have excellent alignment.

BRIEF DESCRIPTION OF THE DRAWINGS

FIG. 1 schematically shows a structure of a liquid crystal cell including a vertical alignment layer according to an exemplary embodiment of the present invention.

DETAILED DESCRIPTION OF THE EMBODIMENTS

The terminology used herein is for the purpose of describing particular embodiments only and is not intended to be limiting of the present invention. Singular forms are intended to include plural forms unless the context clearly indicates otherwise. It will be further understood that the terms "comprises", "provides" and/or "has," when being used in this specification, specify the presence of stated features, numbers, steps, or components, or combinations thereof, but do not exclude the presence or addition of one or more other features, numbers, steps, components, or combinations thereof.

In addition, in the present invention, the description that each layer or element is formed "on" or "over" of each of the layers or elements means that each layer or element is directly formed over each of the layers or elements, or means that another layer or element is additionally formed between each layer, or on a subject or a substrate.

Although the present invention may be modified variously and have several embodiments, the exemplary embodiments are illustrated in the accompanying drawings and will be described in detail in the detailed description. However, the present invention is not limited to the specific embodiments and should be construed as including all the changes, equivalents, and substitutions included in the spirit and scope of the present invention.

Before explaining the present invention, each substituent used in the present specification is specifically defined as follows.

First, "alkyl" means a linear or branched saturated monovalent hydrocarbon moiety of 1 to 20 carbon atoms, preferably, 1 to 10 carbon atoms, and more preferably, 1 to 6 carbon atoms. The alkyl group may encompass not only those unsubstituted but also those further substituted with a predetermined substituent to be described later. Examples of the alkyl group may include methyl, ethyl, propyl, 2-propyl, n-butyl, iso-butyl, tert-butyl, pentyl, hexyl, dodecyl, fluoromethyl, difluoromethyl, trifluoromethyl, chloromethyl, dichloromethyl, trichloromethyl, iodomethyl, bromomethyl, etc.

"Alkenyl" means a linear or branched monovalent hydrocarbon moiety of 2 to 20 carbon atoms, preferably, 2 to 10 carbon atoms, and more preferably, 2 to 6 carbon atoms, with at least one carbon-carbon double bond. The alkenyl groups may be linked via carbon atoms including a carbon-carbon double bond, or via saturated carbon atoms. The alkenyl group may encompass not only those unsubstituted but also those further substituted with a predetermined substituent to be described later. Examples of the alkenyl group may include ethenyl, 1-propenyl, 2-propenyl, 2-butenyl, 3-butenyl, pentenyl, 5-hexenyl, dodecenyl, and the like.

"Cycloalkyl" means a saturated or unsaturated non-aromatic monovalent monocyclic, bicyclic, or tricyclic hydrocarbon moiety of 3 to 12 ring carbons, and may encompass those further substituted with a predetermined substituent to be described later. For example, examples of the cycloalkyl may include cyclopropyl, cyclobutyl, cyclopentyl, cyclopentenyl, cyclohexyl, cyclohexenyl, cycloheptyl, cyclooctyl, decahydronaphthalenyl, adamantyl, norbornyl (that is, bicyclo [2,2,1] hept-5-enyl), etc.

"Aryl" means a monovalent monocyclic, bicyclic or tricyclic aromatic hydrocarbon moiety of 6 to 40 ring atoms, preferably, 6 to 12 ring atoms, and may encompass those further substituted with a predetermined substituent to be described later. Examples of the aryl group may include phenyl, naphthalenyl, fluorenyl, etc.

"Alkoxyaryl" means a moiety in which at least one hydrogen atom of the aryl group defined above is substituted with an alkoxy group. Examples of the alkoxyaryl group may include methoxyphenyl, ethoxyphenyl, propoxyphenyl, butoxyphenyl, pentoxyphenyl, heptoxyphenyl, heptoxy, octoxy, nanoxy, methoxybiphenyl, methoxynaphthalenyl, methoxyfluorenyl, methoxyanthracenyl, etc.

"Arylalkyl" means a moiety in which at least one hydrogen atom of the alkyl group defined above is substituted with an aryl group, and may encompass those further substituted with a predetermined substituent to be described later. Examples of the arylalkyl group may include benzyl, benzhydryl, trityl, etc.

"Alkynyl" means a linear or branched monovalent hydrocarbon moiety of 2 to 20 carbon atoms, preferably 2 to 10 carbon atoms, and more preferably, 2 to 6 carbon atoms, with at least one carbon-carbon triple bond. The alkynyl groups may be linked via carbon atoms including a carbon-carbon triple bond, or via saturated carbon atoms. The alkynyl group may encompass those further substituted with a predetermined substituent to be described later. Examples of the alkynyl group may include ethinyl, propynyl, etc.

First, "alkylene" means a linear or branched saturated bivalent hydrocarbon moiety of 1 to 20 carbon atoms, preferably, 1 to 10 carbon atoms, and more preferably, 1 to 6 carbon atoms. The alkylene group may encompass those further substituted with a predetermined substituent to be described later. Examples of the alkylene group may include methylene, ethylene, propylene, butylene, hexylene, etc.

"Alkenylene" means a linear or branched bivalent hydrocarbon moiety of 2 to 20 carbon atoms, preferably, 2 to 10 carbon atoms, and more preferably, 2 to 6 carbon atoms, with at least one carbon-carbon double bond. The alkenylene groups may be linked via carbon atoms including a carbon-carbon double bond, and/or via saturated carbon atoms. The alkenylene group may encompass those further substituted with a predetermined substituent to be described later.

"Cycloalkylene" means a saturated or unsaturated non-aromatic bivalent monocyclic, bicyclic, or tricyclic hydrocarbon moiety of 3 to 12 ring carbons, and may encompass those further substituted with a predetermined substituent to be described later. Examples of the cycloalkylene group may include cyclopropylene, cyclobutylene, etc.

"Arylene" means a bivalent monocyclic, bicyclic or tricyclic aromatic hydrocarbon moiety of 6 to 20 ring atoms, preferably, 6 to 12 ring atoms, and may encompass those further substituted with a predetermined substituent to be described later. The aromatic moiety includes only carbon atoms. Examples of the arylene group may include phenylene, etc.

"Alkynylene" means a linear or branched bivalent hydrocarbon moiety of 2 to 20 carbon atoms, preferably 2 to 10 carbon atoms, and more preferably, 2 to 6 carbon atoms, with at least one carbon-carbon triple bond. The alkynylene groups may be linked via carbon atoms including a carbon-carbon triple bond, or via saturated carbon atoms. The alkynylene group may encompass those further substituted with a predetermined substituent to be described later. Examples of the alkynylene group may include ethinylene, propynylene, etc.

As used herein, the expression: the above-described substituents are "substituted or unsubstituted" means to encompass not only these individual substituents themselves but also those further substituted with a predetermined substituent. In the present specification, unless explicitly described otherwise, examples of the substituent to be further substitutable in each substituent may include halogen, alkyl, alkenyl, alkynyl, haloalkyl, haloalkenyl, haloalkynyl, aryl, haloaryl, arylalkyl, haloarylalkyl, alkoxy, haloalkoxy, carbonyloxy, halocarbonyloxy, aryloxy, haloaryloxy, silyl, siloxy or "polar functional groups including oxygen, nitrogen, phosphorus, sulfur, silicon or boron" to be described below, etc.

In addition, the copolymer means a polymer including all of a homopolymer formed by polymerization of single monomers and a copolymer or a terpolymer formed by copolymerization of two or more different monomers.

In addition, in the present specification, "the vertical alignment layer" refers to a kind of the alignment layer which determines an alignment state of initial liquid crystal molecules having dielectric anisotropy before voltage is applied to the liquid crystal molecules in a liquid crystal display device, and means an alignment layer in which an initial alignment of the liquid crystal molecules is completely parallel to a normal direction of the substrate, or slightly inclined from the normal direction of the substrate toward one direction in a substrate surface, such that the liquid crystal molecules are tilted in a desired predetermined direction or tilted without the predetermined direction so that the liquid crystal molecules are parallel to the substrate by the voltage application, thereby generating alignment change.

When a vertical alignment optical film including the vertical alignment layer is used alone or combined with other films, the film may be used as an alignment layer for liquid crystal alignment in TN (Twist Nematic) mode, STN (Super Twist Nematic) mode, IPS (In Plane Switching) mode, VA (Vertical Alignment) mode, OCB (Optically Compensated Birefringence) mode, etc., of liquid crystal display (LCD) devices. In addition, the film may be manufactured by coating a conventional alignment agent to form thin alignment layers, then, overlapping two sheets thereof, and injecting the liquid crystal.

Hereinafter, the vertical alignment layer according to an exemplary embodiment of the present invention is described in detail.

According to an exemplary embodiment of the present invention, there is a vertical alignment layer including a cyclic olefin copolymer represented by Chemical Formula 1 below:

[Chemical Formula 1]

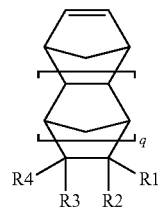

in Chemical Formula 1,
q is an integer of 0 to 4,
at least one of R1 to R4 is a radical represented by Chemical Formula 1a below,
remaining R1 to R4 except for the radical represented by Chemical Formula 1a below are the same as each other or different from each other, and are each independently selected from the group consisting of hydrogen; halogen; substituted or unsubstituted C1-C20 linear or branched alkyl; substituted or unsubstituted C2-C20 linear or branched alkenyl; substituted or unsubstituted C2-C20 linear or branched alkynyl; substituted or unsubstituted C3-C12 cycloalkyl; substituted or unsubstituted C6-C40 aryl; substituted or unsubstituted C5-C12 arylalkyl; and a polar functional group including at least one selected from oxygen, nitrogen, phosphorus, sulfur, silicon, and boron, when R1 to R4 are not hydrogen; halogen; or the polar functional group, at least one combination of R1 and R2 or R3 and R4 may be linked to each other to form a C1-C10 alkylidene group, or R1 or R2 may be linked to any one of R3 and R4 to form a C4-C12 saturated or unsaturated aliphatic ring, or a C6-C24 aromatic ring,

[Chemical Formula 1a]

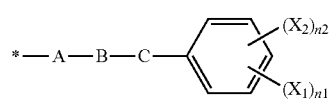

in Chemical Formula 1a,
A and C are each independently a simple bond, or substituted or unsubstituted C1-C5 alkylene,
B is ester,
n1 and n2 are each independently an integer of 0 to 5, and n1+n2 are an integer of 1 to 5,
$X_1$ and $X_2$ are substituents substituted in a benzene ring, and each independently a fluorine atom (F), C1-C5 fluorinated alkyl, C1-C5 fluorinated alkoxy, C6-C20 fluorinated aryl, or C6-C20 fluorinated alkoxyaryl.

The compound represented by Chemical Formula 1 may have a chemical structure in which a predetermined substituent (Chemical formula 1a), for example, a functional group such as a substituted benzoic acid ester structure or a phenyl ester structure is introduced into a cyclic olefin structure that is usable as a precursor of various compounds or a monomers of a polymer, etc. Due to the chemical structure into which the functional group is introduced, the cyclic olefin compound represented by Chemical Formula 1 itself may be used as an alignment compound.

In addition, according to properties of the cyclic olefin structure which is usable as the precursor, etc., various compounds or copolymers may be prepared from the compound represented by Chemical Formula 1, and the compound or the polymer prepared as above may also exhibit excellent alignment even without performing separate UV process, etc. Accordingly, it is possible to use the cyclic olefin compound to prepare various alignment compounds or copolymers, etc., that are applicable to various optical application fields.

In addition, the cyclic olefin compound may have a chemical structure in which benzoic acid ester substituted with a fluorine atom (F), a fluorinated alkyl group, a fluorinated alkoxy group, a fluorinated aryl group, or a fluorinated alkoxyaryl group, or phenyl ester substituted with a fluorine atom (F), a fluorinated alkyl group, a fluorinated alkoxy group, a fluorinated aryl group, or a fluorinated alkoxyaryl group is bound. Due to the chemical structure, the alignment copolymer obtained from the cyclic olefin compound represented by Chemical Formula 1 is capable of exhibiting improved interaction with the liquid crystal molecules, and more effectively inducing alignment even in a low temperature process, and further, does not require a separate high temperature imidization process, such that the alignment copolymer obtained from the cyclic olefin compound represented by Chemical Formula 1 may be preferably used for a liquid crystal alignment layer, etc., in which a low temperature process is relatively required as compared to an alignment layer, etc., in which polyimide is used.

Further, by controlling A and C in the structure of Chemical Formula 1a into alkylene having various lengths or controlling $X_1$ and $X_2$ into substituents having various structures, alignment in the low temperature process with respect to the copolymer obtained therefrom may be easily controlled.

Hereinafter, the cyclic olefin compound and the alignment copolymer obtained therefrom, etc., are described in more detail.

In the cyclic olefin compound, the polar functional group that is substitutable in R1 to R4, that is, the polar functional group including at least one selected from oxygen, nitrogen, phosphorus, sulfur, silicon, and boron may be selected from the group consisting of functional groups to be listed below, and may be various polar functional groups including at least one selected from oxygen, nitrogen, phosphorus, sulfur, silicon, and boron:

—$OR_6$, —$OC(O)OR_6$, —$R_5OC(O)OR_6$, —$C(O)OR_6$, —$R_5C(O)OR_6$, —$C(O)R_6$, —$R_5C(O)R_6$, —$OC(O)R_6$, —$R_5OC(O)R_6$, —$(R_5O)_p$—$OR_6$, —$OR_{5p}$—$OR_6$, —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$—, —$R_5C(=S)SR_6$, —$R_5SO_3R_6$, —$SO_3R_6$, —$R_5N=C=S$, —$N=C=S$, —$NCO$, —$R_5$—$NCO$, —$CN$, —$R_5CN$, —$NNC(=S)R_6$, —$R_5NNC(=S)R_6$, —$NO_2$, —$R_5NO_2$,

—C(O)N(R_6)(R_7), —R_5C(O)N(R_6)(R_7), —N(R_6)(R_7), —R_5N(R_6)(R_7),

—OC(O)N(R_6)(R_7), —R_5OC(O)N(R_6)(R_7), —SR_6(=O)_2, —R_5SR_6(=O)_2,

—OSR_6(=O)_2, —R_5OSR_6(=O)_2, —OSOR_6(=O), —R_5OSOR_6(=O),

—B(R_6)(R_7), —R_5B(R_6)(R_7), —B(OR_6)(OR_7), —R_5B(OR_6)(OR_7),

—N(R_6)C(=O)R_7, —R_5N(R_6)C(=O)R_7, —N(R_6)C(=O)OR_7,

—R_5N(R_6)C(=O)OR_7, epoxide with R_6,R_7,R_8, R_5-epoxide with R_6,R_7,R_8,

—C(=O)N(R_6)C(=O)OR_7, —R_5C(=O)N(R_6)C(=O)OR_7,

—P(R_6)(R_7), —R_5P(R_6)(R_7), —P(OR_6)(OR_7), —R_5P(OR_6)(OR_7),

—OP(OR_6)(OR_7), —R_5OP(OR_6)(OR_7), —P(=O)(OR_6)(OR_7), —R_5P(=O)(OR_6)(OR_7),

—OP(=O)(OR_6)(OR_7), —R_5OP(=O)(OR_6)(OR_7), —Si(R_6)(R_7)(R_8), —R_5Si(R_6)(R_7)(R_8),

—Si(OR_6)(OR_7)(OR_8), —R_5Si(OR_6)(OR_7)(OR_8), —O—R_5—Si(R_6)(R_7)(R_8),

—O—R_5—Si(OR_6)(OR_7)(OR_8), —R_5—O—R_5—Si(R_6)(R_7)(R_8),

—R_5—O—R_5—Si(OR_6)(OR_7)(OR_8), —C(=O)—O—R_5—Si(R_6)(R_7)(R_8),

—C(=O)—O—R_5—Si(OR_6)(OR_7)(OR_8), —R_5—C(=O)—O—R_5—Si(R_6)(R_7)(R_8),

—R_5—C(=O)—O—R_5—Si(OR_6)(OR_7)(OR_8),

—O—R_5—O—R_5—Si(R_6)(R_7)(R_8),

—O—R_5—O—R_5—Si(OR_6)(OR_7)(OR_8),

—O—R_5—C(=O)—O—R_5—Si(R_6)(R_7)(R_8),

—O—R_5—C(=O)—O—R_5—Si(OR_6)(OR_7)(OR_8),

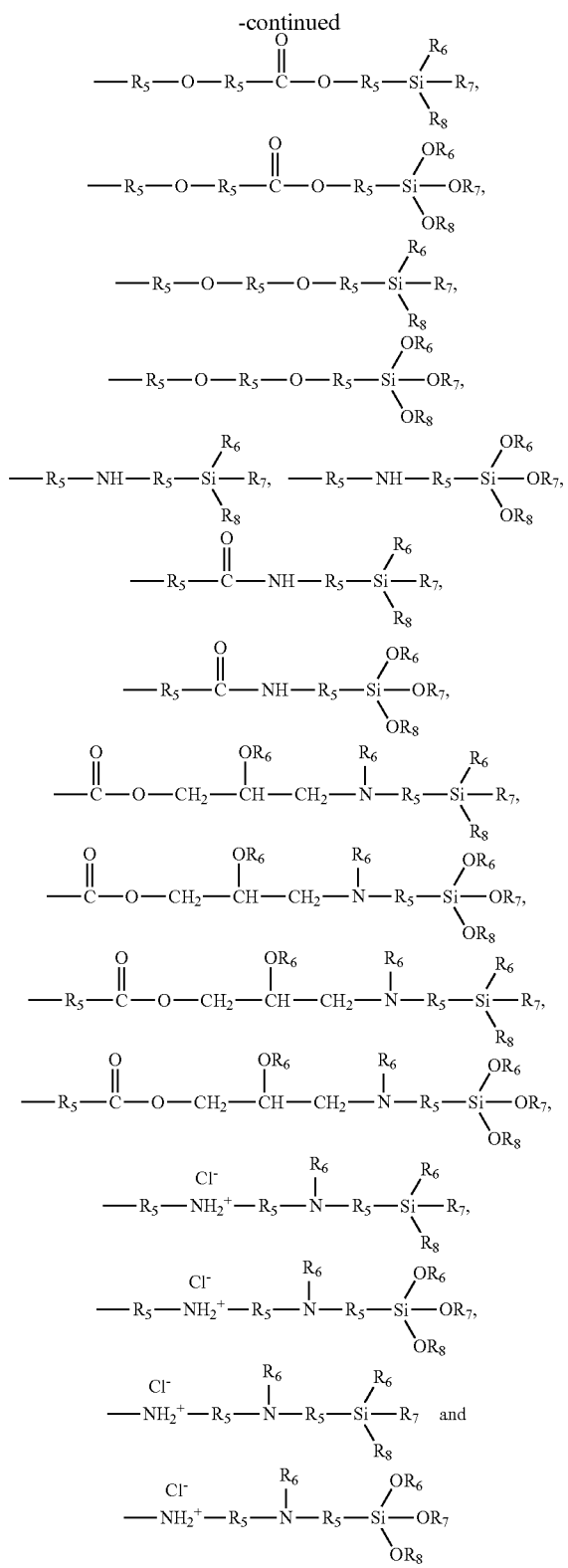

In the polar functional group, p is each independently an integer of 1 to 10, $R_5$ is substituted or unsubstituted C1-C20 linear or branched alkylene; substituted or unsubstituted C2-C20 linear or branched alkenylene; substituted or unsubstituted C2-C20 linear or branched alkynylene; substituted or unsubstituted C3-C12 cycloalkylene; substituted or unsubstituted C6-C40 arylene; substituted or unsubstituted C1-C20 carbonyloxylene; or substituted or unsubstituted C1-C20 alkoxylene, and $R_6$, $R_7$ and $R_8$ are each independently selected from the group consisting of hydrogen; halogen; substituted or unsubstituted C1-C20 linear or branched alkyl; substituted or unsubstituted C2-C20 linear or branched alkenyl; substituted or unsubstituted C2-C20 linear or branched alkynyl; substituted or unsubstituted C3-C12 cycloalkyl; substituted or unsubstituted C6-C40 aryl; substituted or unsubstituted C1-C20 alkoxy; and substituted or unsubstituted C1-C20 carbonyloxy.

In addition, in the structure represented by Chemical Formula 1a, a benzene ring linked with the cyclic olefin through a simple bond of A and C or an alkylene group may be mono- to penta-substituted with a fluorine atom (F), a fluorinated alkyl group, a fluorinated alkoxy group, a fluorinated aryl group, or a fluorinated alkoxyaryl group corresponding to $X_1$ and $X_2$. Specifically, for example, $X_1$ and $X_2$ may be each independently, a fluorine atom (F); C1-C5 linear or branched alkyl group in which at least one hydrogen is substituted with the fluorine atom; C1-C5 linear or branched alkoxy group in which at least one hydrogen is substituted with the fluorine atom; C5-C20 aryl group in which at least one hydrogen is substituted with the fluorine atom; C5-C20 fluorinated alkoxyaryl group in which at least one hydrogen included in the alcoxy group is substituted with the fluorine atom.

The above-described specific substituents are introduced into the cyclic olefin, such that the cyclic olefin compound represented by Chemical Formula 1 may have strong hydrophobic surface energy, thereby having characteristic in which the initial alignment of the liquid crystal molecule is capable of being determined in a direction vertical to the film.

The above-described cyclic olefin compound may be prepared by general methods in which the specific substituents, more specifically, the functional group represented by Chemical Formula 1a above, etc., are introduced into the cyclic olefin, for example, a norbornene-based compound. For example, the cyclic olefin compound may be prepared by condensation reaction of norbornene alkylol such as norbornene methanol, etc., and a carboxylic acid compound or an acyl chloride compound having a functional group corresponding to Chemical Formula 1a, and may be prepared by introducing functional groups through various methods according to structures and kinds of the other functional group of Chemical Formula 1a.

According to an exemplary embodiment of the present invention, the cyclic olefin copolymer represented by Chemical Formula 1 above may be an alignment copolymer including a repeating unit represented by Chemical Formula 2a or 2b below:

[Chemical Formula 2a]

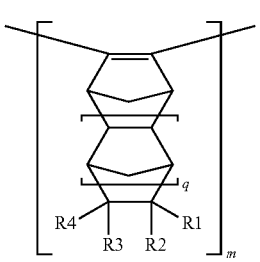

[Chemical Formula 2b]

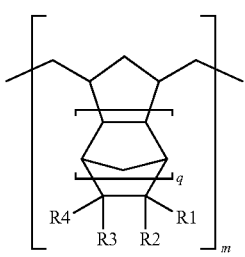

in Chemical Formulas 2a and 2b, each independently,
m is 50 to 5000, and
q and R1 to R4 are the same as described in the cyclic olefin compound represented by Chemical Formula 1 above.

The alignment copolymer includes the repeating unit derived from the cyclic olefin compound, which may exhibit excellent alignment. In particular, the alignment copolymer has the above-described structure of Chemical Formula 1a, which may exhibit improved interaction with the liquid crystal molecules. In addition, alignment may be easily controlled by selecting and controlling A and C in the substituents of Chemical Formula 1a into alkylene having various lengths and selecting and controlling the substituent of the benzene ring into one of a fluorine atom (F), a fluorinated alkyl group, a fluorinated alkoxy group, a fluorinated aryl group, or a fluorinated alkoxyaryl group.

In addition, the alignment copolymer includes a norbornene-based repeating unit represented by Chemical Formula 2a or 2b as a main repeating unit. The norbornene-based repeating unit is structurally strong, and the alignment copolymer including the norbornene-based repeating unit has a relatively high glass transition temperature (Tg) of about 300° C. or more, preferably, about 300° C. to 350° C., thereby exhibiting excellent thermal stability as compared to the alignment copolymer, etc., known in the art. In addition, the alignment copolymer has a structural characteristic in which the functional group is bound to the norbornene-based repeating unit, such that the functional group is capable of being relatively freely moved in the main chain of the polymer, whereby excellent alignment may be exhibited.

Accordingly, the alignment copolymer may be preferably used for a liquid crystal alignment layer for alignment, and may be preferably applied to various optical application fields.

Since definitions of each substituent linked to the alignment copolymer have been described in detail in Chemical Formula 1 above, description thereof will be omitted.

In addition, the repeating unit represented by Chemical Formula 2a or 2b below constituting the alignment copolymer may have a polymerization degree of about 50 to about 5,000, preferably, about 100 to about 4,000, and more preferably, about 1,000 to about 3,000. Accordingly, the alignment copolymer may be appropriately included in the coating composition for forming the alignment layer to exhibit excellent coating property, and the alignment layer formed therefrom may exhibit excellent liquid crystal alignment, etc.

The above-described alignment copolymer may be prepared by the following method.

A method for preparing the alignment copolymer according to an exemplary embodiment of the present invention includes forming the repeating unit of Chemical Formula 2a by performing addition-polymerization a monomer of Chemical Formula 1 in the presence of a catalyst composition containing a pre-catalyst including a Group 10 transition metal and a cocatalyst.

Here, the polymerization reaction may be performed at a temperature of 10° C. to 200° C. When the reaction temperature is less than 10° C., a polymerization activity may be reduced, and when the reaction temperature is more than 200° C., it is not preferable since the catalyst may be decomposed.

In addition, the cocatalyst may include at least one selected from the group consisting of a first cocatalyst providing a Lewis base capable of weak-coordination bonding with a metal of the pre-catalyst; and a second cocatalyst providing a compound including a Group 15 electron donor ligand. Preferably, the cocatalyst may be a catalyst mixture including the first cocatalyst providing the Lewis base, and selectively including the second cocatalyst providing the compound including the neutral Group 15 electron donor ligand.

Here, the catalyst mixture may include the first cocatalyst at an amount of about 1 to about 1000 mole, and may include the second cocatalyst at an amount of about 1 to about 1000 mole, based on 1 mol of the pre-catalyst. When the amount of the first cocatalyst or the second cocatalyst is excessively small, activation of the catalyst may not be properly achieved. On the contrary, when the amount thereof is excessively large, a catalyst activity may rather be reduced.

In addition, as the pre-catalyst including a Group 10 transition metal, a compound having a Lewis base functional group which easily participates in Lewis acid-base reaction and is detached from the central metal may be used so that it is easily separated by the first cocatalyst providing Lewis base, and a transition metal center is changed into a catalyst activity species. For example, examples of the pre-catalyst may include [(Allyl)Pd(Cl)]$_2$(Allylpalladiumchloride dimer), (CH$_3$CO$_2$)$_2$Pd [Palladium(II)acetate], [CH$_3$COCH=C(O—)CH$_3$]$_2$Pd [Palladium(II)acetylacetonate], NiBr(NP CH$_{33}$)$_4$, [PdCl(NB)OCH$_3$]$_2$, etc.

In addition, as the first cocatalyst providing Lewis base capable of weak-coordination bonding with the metal of the pre-catalyst, a compound that easily reacts with Lewis base to generate vacancy of the transition metal, and weak-coordination bonds with the transition metal compound in order to stabilize the transition metal generated as above, or a compound providing the same, may be used. For example, examples thereof may include borane such as B(C6F5)3 or borate such as dimethylanilinium tetrakis(pentafluorophenyl)borate, aluminum such as methylaluminoxane (MAO) or Al(C$_2$H$_5$)$_3$, transition, transition metal halide such as AgSbF$_6$, etc.

In addition, as the second cocatalyst providing the compound including the neutral Group 15 electron donor ligand, alkyl phosphine, cycloalkyl phosphine, phenyl phosphine, etc., may be used.

Further, the first cocatalyst and the second cocatalyst may be separately used, but these two cocatalysts may be prepared as one salt, and the prepared salt of two cocatalysts may be used as a compound for activating the catalyst. For example, a compound in which alkyl phosphine is linked with borane or borate compound through ionic bonding, may be used.

According to the above-described method, the repeating unit of Chemical Formula 2a and the alignment copolymer including the same according to an exemplary embodiment may be prepared. In addition, when the alignment copolymer further includes an olefin-based repeating unit, a cyclic olefin-based repeating unit, or an acrylate-based repeating unit, etc., these repeating units may be formed by conventional preparation method of each of the repeating units, and may be copolymerized with the repeating unit of Chemical Formula 2a prepared by the above-described method to obtain the alignment copolymer.

Meanwhile, when the alignment copolymer includes the repeating unit of Chemical Formula 2b, the alignment copolymer may be prepared according to another exemplary embodiment of the preparation method.

The method for preparing the alignment copolymer according to another exemplary embodiment of the present invention includes forming a ring-opening polymer by ring-opening polymerizing a norbornene-ol-based monomer or a norbornene-alkylol-based monomer in the presence of a catalyst composition containing a pre-catalyst including a Group 4, 6 or 8 transition metal and a cocatalyst; and forming the repeating unit of Chemical Formula 2b by introducing the functional group represented by Chemical Formula 1a into the formed ring-opening polymer.

Here, the introduction of the functional group may be performed by condensation reaction between the ring-opening polymer and carboxylic acid or acyl chloride compound having the functional group corresponding to Chemical Formula 1a.

As another selectable method, the alignment copolymer may be prepared by ring-opening polymerizing the monomer of Chemical Formula 1 in the presence of a catalyst composition containing a pre-catalyst including a Group 4, 6 or 8 transition metal and a cocatalyst, thereby forming the repeating unit of Chemical Formula 2b.

In the ring-opening polymerization step, when hydrogen is added to the double bond of the norbornene ring included in the monomer such as Chemical Formula 1, etc., ring-opening may be performed, and the polymerization is performed together with the ring-opening, such that the repeating unit of Chemical Formula 2b, etc., and the alignment copolymer including the repeating unit may be prepared.

The ring-opening polymerization may be performed in the presence of a catalyst mixture including a pre-catalyst containing Group 4 transition metal (for example, Ti, Zr, Hf), Group 6 transition metal (for example, Mo, W), or Group 8 transition metal (for example, Ru, Os), and a cocatalyst providing Lewis base capable of weak-coordination bonding with the metal of the pre-catalyst, and selectively including neutral Group 15 and Group 16 activator capable of improving activity of the metal of the pre-catalyst, etc. Further, in the presence of the catalyst mixture, the polymerization may be performed by adding linear alkene such as 1-alkene, 2-alkene, etc., capable of controlling a molecular weight size, at an amount of about 1 mol % to about 100 mol % based on the monomer, at a temperature of about 10° C. to about 200° C. In addition, a hydrogen addition reaction in which hydrogen is added to the double bond of the norbornene ring may be performed by adding the catalyst including Group 4 transition metal (for example, Ti, Zr) or Group 8 to Group 10 transition metal (for example, Ru, Ni, Pd), at an amount of about 1 mol % to about 30 mol % based on the monomer, at a temperature of about 10° C. to about 250° C.

When the reaction temperature is excessively low, a polymerization activity is reduced, and when the reaction temperature is excessively high, it is not preferable since the catalyst may be decomposed. In addition, when the hydrogen-addition reaction temperature is excessively low, an activity of the hydrogen-addition reaction is reduced, and when the hydrogen-addition reaction temperature is excessively high, it is not preferable since the catalyst may be decomposed.

The catalyst mixture includes about 1 to about 100,000 mol of the cocatalyst providing Lewis base capable of weak-coordination bonding with the metal of the pre-catalyst, and selectively includes about 1 to about 100 mol of the activator including neutral Group 15 and Group 16 element capable of improving activity of the metal of the pre-catalyst, based on 1 mol of the pre-catalyst containing Group 4 transition metal (for example, Ti, Zr, Hf), Group 6 transition metal (for example, Mo, W), or Group 8 transition metal (for example, Ru, Os).

When the cocatalyst has an amount of less than about 1 mol, activation of the catalyst may not be achieved. When the cocalalyst has an amount of more than about 100,000 mol, it is not preferable since the catalyst activity may be reduced. The activator may not be needed depending on kinds of the pre-catalyst. When the activator has an amount of less than about 1 mol, activation of the catalyst may not be achieved. When the activator has an amount of more than about 100 mol, it is not preferable since the molecular weight may be reduced.

When the amount of the catalyst including Group 4 transition metal (for example, Ti, Zr) or Group 8 to Group 10 transition metal (for example, Ru, Ni, Pd) used for the hydrogen-addition reaction is less than about 1 wt % based on the monomer, addition of hydrogen may not be easily achieved, and when the amount thereof is more than about 30 wt %, it is not preferable since the polymer may be discolored.

The pre-catalyst including Group 4 transition metal (for example, Ti, Zr) or Group 6 transition metal (for example, Mo, W) or Group 8 transition metal (for example, Ru, Os) may refer to a transition metal compound such as $TiCl_4$, $WCl_6$, $MoCl_5$ or $RuCl_3$ or $ZrCl_4$ having a functional group which easily participates in Lewis acid-base reaction and is detached from the central metal so that it is easily separated by the cocatalyst providing Lewis base, and a transition metal center is changed into a catalyst activity species.

Further, the cocatalyst providing the Lewis base capable of weak-coordination bonding with the metal of the pre-catalyst may include borane such as $B(C_6F_5)_3$ or borate alkylaluminum such as methylaluminoxane (MAO), $Al(C_2H_5)_3$, or $Al(CH_3)Cl_2$, alkylaluminum halide, or aluminum halide. Otherwise, substituents such as lithium, magnesium, germanium, lead, zinc, tin, silicon, etc., may be used instead of using aluminum. As described above, the cocatalyst providing Lewis base capable of weak-coordination bonding with the metal of the pre-catalyst may be a compound that easily reacts with Lewis base to generate vacancy of the transition metal, and further, weak-coordination bonds with the transition metal compound in order to stabilize the transition metal generated as above, or a compound providing the same.

The activator of the polymerization may be added, but may not be required depending on kinds of the pre-catalyst. Examples of the activator including the neutral Group 15 and Group 16 element capable of improving activity of the metal of the pre-catalyst may include water, methanol, ethanol, isopropyl alcohol, benzylalcohol, phenol, ethylmercaptan(ethyl mercaptan), 2-chloroethanol, trimethylamine, triethylamine, pyridine(pyridine), ethylene oxide(ethylene oxide), benzoyl peroxide, t-butyl peroxide, etc.

The catalyst including Group 4 transition metal (for example, Ti, Zr) or Group 8 to Group 10 transition metal (for example, Ru, Ni, Pd) used for the hydrogen-addition reaction may have a homogeneous form which is capable of being directly mixed with a solvent, or may have a form in which a metal catalyst complex is supported on a particulate support. The particulate support is preferably silica, titania, silica/chromia, silica/chromia/titania, silica/alumina, aluminum phosphate gel, silanated silica, silica hydrogel, montmorillonite clay or zeolite.

According to the above-described method, the repeating unit of Chemical Formula 2a and the alignment copolymer including the same according to an exemplary embodiment may be prepared. In addition, when the alignment copolymer further includes an olefin-based repeating unit, a cyclic olefin-based repeating unit, or an acrylate-based repeating unit, etc., these repeating units may be formed by a conventional preparation method of each of the repeating units, and may be copolymerized with the repeating unit of Chemical Formula 2b prepared by the above-described method to obtain the alignment copolymer.

The vertical alignment layer including the above-described alignment copolymer may include not only a thin-film type alignment film but also a film type alignment film.

FIG. 1 schematically shows a structure of a liquid crystal cell including a vertical alignment layer according to an exemplary embodiment of the present invention. Referring to FIG. 1, it may be confirmed that the liquid crystal cell includes a substrate 100, a vertical alignment layer 200 formed on the substrate, and a liquid crystal layer 300 on the vertical alignment layer. Specifically, two sheets of substrates 100 on which the alignment layer 200 is formed are overlapped with each other, and liquid crystal is injected therebetween, thereby forming the liquid crystal layer 300.

The vertical alignment layer may be prepared by using components and manufacturing methods known in the art, except for including the above-described alignment copolymer as the alignment polymer.

For example, the vertical alignment layer may be formed by mixing the alignment copolymer, a binder resin, and a photoinitiator, dissolving the mixture in an organic solvent, to obtain a coating composition, and coating the coating composition onto a substrate, followed by UV curing.

Here, the binder resin may be an acrylate-based resin, and more specifically, may be pentaerythritol triacrylate, di pentaerythritol hexaacrylate, trimethylolpropane triacrylate, tris (2-acryloyloxyethyl) isocyanurate, etc.

Further, as the photoinitiator, general photoinitiators known to be usable for the vertical alignment layer may be used without particular limitation. For example, photoinitiators known as Irgacure 907, Irgacure 819, may be used.

In addition, the organic solvent may be toluene, anisol, chlorobenzene, dichloroethane, cyclohexane, cyclopentane, propyleneglycol methylether acetate, etc. Since the above-described alignment norbornene-based copolymer has excellent solubility with respect to various organic solvents, various organic solvents except for the above-described examples may be used without particular limitation.

In the coating composition, a solid concentration including the alignment copolymer, the binder resin, and the photoinitiator may be 1 to 15 wt %, and preferably, 10 to 15 wt % in order for the vertical alignment layer to be casted in a film type, and 1 to 5 wt % in order for the vertical alignment layer to be formed in a thin film type.

The vertical alignment layer formed as above may be formed on the substrate and below the liquid crystal as shown in FIG. 1, thereby having a function of aligning the liquid crystal molecules. Here, as the substrate, a substrate containing a cyclic polymer, a substrate containing an acrylic polymer, a substrate containing a cellulose polymer, etc., may be used, and AgNW substrate, ITO substrate, FTO substrate, etc., having conductivity to electrically drive the liquid crystal may also be used. The vertical alignment layer may be formed by coating the coating composition onto the substrate through various methods such as bar coating, spin coating, blade coating, etc., followed by UV curing.

As the UV, a polarization UV selected from ∟ polarizing devices using substrates in which a material having dielectric anisotropy is coated onto a surface of transparent substrates such as quartz glass, soda lime glass, soda lime free glass, etc., ∟ polarizing plates in which aluminum or metal wires are finely deposited, and ∟ polarization-treated UV using a method of passing or reflecting a Brewster polarizing device, etc., by reflection of quartz glass, may be applied.

A temperature of the substrate when being irradiated with UV is preferably room temperature. However, in some cases, the substrate may be irradiated with UV in a state in which the substrate is heated within a temperature range of 100° C. or less. A final film to be formed by a series of processes as described above preferably has a film thickness of about 30 nm to about 1000 nm.

According to the above-described method, the liquid crystal cell may be manufactured by a general method in which two sheets of the vertical alignment layers are formed and overlapped with each other, and liquid crystal is injected therebetween. The vertical alignment layer may include the alignment copolymer to exhibit excellent interaction with the liquid crystal molecules, and accordingly, it is possible to effectively perform the initial alignment of the liquid crystal molecules.

The above-described vertical alignment layer or the liquid crystal cell may be applied to an optical film or an optical filter for implementing three-dimensional images.

Accordingly, according to another exemplary embodiment of the present invention, there is provided a display device including the vertical alignment layer. The display device may be a liquid crystal display device in which the vertical alignment layer is included for alignment of liquid crystal, a three-dimensional image display device in which the vertical alignment layer is included in an optical film or an optical filter, etc., for implementing three-dimensional images, etc. Meanwhile, the configuration of the display device is complied with those of general devices except for including the above-described alignment copolymer and the vertical alignment layer, such that more detailed description thereof will be omitted.

Hereinafter, preferable Examples of the present invention will be provided for better understanding of the present invention. However, the following Examples are provided only for illustration of the present invention, and should not be construed as limiting the present invention by the examples.

In addition, all operations using compounds sensitive to air or water in the following Examples were carried out using a standard Schlenk technique or a dry box technique. Nuclear magnetic resonance (NMR) spectra were obtained by using a Bruker 300 spectrometer, wherein $^1$H NMR was measured at 300 MHz and $^{13}$C NMR was measured at 75 MHz, respectively. A molecular weight and a molecular weight distribution of the ring-opened hydrogenated polymer were measured by using GPC (gel permeation chromatography), wherein a polystyrene sample was used as a standard sample.

Toluene was purified by distillation from potassium/ benzophenone, and dichloromethane was distilled and purified from $CaH_2$.

EXAMPLE

Preparation of Photopolymerizable Olefin

Preparation Example 1

Synthesis of 3-(trifluoromethyl)phenyl bicyclo[2.2.1]hept-5-ene-2-carboxylate 3-hydroxybenzotifluoride (100.0 g, 0.62 mol, Fw=162.11), N-(3-dimethylaminopropyl)-N'-ethylcarbodiimide hydrochloride (EDCl, 142.83 g, 0.92 mol, Fw=155.25), and N,N-dimethylamidopyridine (DMAP, 112.40 g, 0.92 mol, Fw=122.17) were added to a flask, and $CH_2Cl_2$ (1000 ml) was added thereto.

5-norbornene-2-methanol (76.99 g, 0.28 mol, Fw=124.18) was added, and stirred at room temperature for 20 hours.

After the reaction was completed, water was added to extract an organic layer, and the organic layer was washed with brine.

The organic layer was dried over magnesium sulfate and filtered, followed by column chromatography (EA:Hex=1:7), thereby obtaining a compound of Preparation Example 1.

$H^1$-NHM ($CDCl_3$ 500 MHz, ppm)

1.50 (1, quin), 1.75-1.99 (2, m), 1.99 (1, quin), 2.37 (1, q), 2.84 (1, m), 3.69 (1, m), 6.05 (2, dd), 7.33-7.35 (2, m), 7.52 (1, dd)

Preparation Example 2

Synthesis of 2,4,5-trifluorobenzyl bicyclo[2.2.1]hept-5-ene-2-carboxylate

A compound of Preparation Example 2 was obtained by the same method as Preparation Example 1 above except for using the same mol of 2,4,5-trifluorobenzyl alcohol instead of using 3-hydroxybenzotifluoride.

$H^1$-NHM ($CDCl_3$ 500 MHz, ppm)

1.50 (1, quin), 1.75-1.99 (2, m), 1.99 (1, quin), 2.37 (1, q), 2.84 (1, m), 3.69 (1, m), 5.34 (2, s), 6.05 (2, dd), 6.69 (1, m), 6.93 (1, m)

Preparation Example 3 bicyclo[2.2.1]hept-5-en-2-ylmethyl 4-(trifluoromethoxy)benzoate의 Synthesis 4-(Trifluoromethoxy) benzoic acid (0.485 mol), norbornene-5-ol (0.485 mol), and Zr(AcAc) (0.2 mol %) were added to xylene, and stirred at 190° C. for 2 hours. After stirring, the resulting material was washed with 1M HCl and 1M $NaHCO_3$ aqueous solution, respectively, and a solvent was removed therefrom, thereby obtaining a compound of Preparation Example 3 in a solid state.

$H^1$-NHM ($CDCl_3$ 500 MHz, ppm)

1.31 (1, m), 1.50-1.56 (2, m), 1.75 (1, m), 2.13 (1, sex), 2.58 (1, m), 2.84 (1, m), 4.41 (1, dd), 4.66 (1, dd), 6.05 (2, dd), 7.04 (2, d), 7.94 (1, d)

Preparation Example 4

Synthesis of bicyclo[2.2.1]hept-5-en-2-ylmethyl 3,4-difluorobenzoate

A compound of Preparation Example 4 was obtained by the same method as Preparation Example 3 above except for using the same mol of 3,4-difluorobenzoic acid instead of using 4-(trifluoromethoxy)benzoic acid.

$H^1$-NHM ($CDCl_3$ 500 MHz, ppm)

1.31 (1, m), 1.50-1.56 (2, m), 1.75 (1, m), 2.13 (1, sex), 2.58 (1, m), 2.84 (1, m), 4.41 (1, dd), 4.66 (1, dd), 6.05 (2, dd), 7.29 (1, m), 7.61 (1, m), 7.76 (1, m)

Preparation Example 5

Synthesis of 4'-fluorobiphenyl-4-yl bicyclo[2.2.1]hept-5-ene-2-carboxylate

A compound of Preparation Example 5 was obtained by the same method as Preparation Example 1 above except for using the same mol of 4-fluouro-4'-hydroxybiphenyl instead of using 3-hydroxybenzotifluoride.

$H^1$-NHM ($CDCl_3$ 500 MHz, ppm)

1.50 (1, quin), 1.74-1.75 (2, m), 1.99 (1, m), 2.37 (1, m), 2.84 (1, m), 3.69 (1, m), 6.05 (2, dd), 7.13 (2, d), 7.15 (2, d), 7.52 (2, m), 7.74 (2, d)

Preparation Example 6

Synthesis of bicyclo[2.2.1]hept-5-en-2-ylmethyl 4'-(trifluoromethoxy)biphenyl-4-carboxylate 4-methoxycarbonylphenylboronic acid (14.93 g, 0.082 mol), 4-bromobenzotrifluoride (20 g, 0.08298 mol), and $K_2CO_3$ (25.23 g, 0.18 mol, 2.2 eq) were added in a solvent containing EGME (ethylene glycol monomethyl ether) and $H_2O$ at a ratio of 3:1, and stirred. $Pd(OAc)_2$ was dissolved in a solvent containing EGME (ethylene glycol monomethyl ether) and $H_2O$ at a ratio of 3:1 and injected with a syringe under argon atmosphere. The resulting material was extracted with an organic solvent, followed by column chromatography with hexane:EA (ethyl acetate)=20:1, thereby obtaining methyl-4'-(trifluoromethoxy)-[1,1'-biphenyl]-4-carboxylate (18.73 g) (yield: 76%).

Methyl-4'-(trifluoromethoxy)-[1,1'-biphenyl]-4-carboxylate (18.4 g) (0.06 mol) was added to methanol and stirred, and dissolved at 50° C. KOH (20.90 g, 0.37 mol) was dissolved in methanol, and added to the stirred flask.

After the reaction was performed overnight at 50° C., 1M HCl with the same volume was poured to neutralize non-reacted KOH, and the resulting material was precipitated.

After filtering, the resulting material was dried in a vacuum oven at 50° C. for 12 hours, thereby obtaining a compound of Preparation Example 6 (16.8 g) (yield: 95.86%).

$H^1$-NHM ($CDCl_3$ 500 MHz, ppm)

1.31 (1, m), 1.50-1.56 (2, m), 1.75 (1, m), 2.13 (1, sex), 2.58 (1, m), 4.41 (1, dd), 4.66 (1, dd), 6.05 (2, dd), 7.03 (2, d), 7.61 (2, d), 7.75 (2, d), 8.032 (2, d)

Preparation Example 7

Synthesis of bicyclo[2.2.1]hept-5-en-2-ylmethyl 4-(perfluorobutoxy)benzoate

Methyl-4-hydroxybenzoate (1 eq), nonafluorobutyl iodide (2 eq), $K_2CO_3$ (3 eq) were dissolved in DMSO, and stirred at 130° C. for 16 hours.

After the reaction was completed, the resulting material was extracted with water and toluene, and an organic layer was washed with brine.

The organic layer was dried over magnesium sulfate and filtered, followed by column chromatography (EA:Hex=1:10), thereby obtaining methyl-4-(2,2,2-trifluoroethoxy)benzoate. (8.6 g, 56%)

Methyl-4-(2,2,2-trifluoroethoxy)benzoate and KOH (10 eq) were added to ethanol, and refluxed for 2 hours. Then, a solvent was removed under reduced pressure.

The resulting material was dissolved in distilled water again, and precipitated by adding 1N HCl thereto, and filtered. The resulting material was washed with distilled water and dried in a vacuum oven for 12 hours, thereby obtaining a compound of Preparation Example 7 (5.2 g) (yield: 76%).

$H^1$-NHM (CDCl$_3$ 500 MHz, ppm)
1.31 (1, m), 1.50-1.56 (2, m), 1.75 (1, m), 2.13 (1, sex), 2.58 (1, m), 2.84 (1, m), 4.41 (1, dd), 4.66 (1, dd), 6.05 (2, dd), 7.04 (2, d), 7.94 (2, d)

Preparation Example 8

Synthesis of bicyclo[2.2.1]hept-5-en-2-ylmethyl 4-(2,2,2-trifluoroethoxy)benzoate A compound of Preparation Example 8 was obtained by the same method as Preparation Example 7 above except for using the same mol of 1,1,1-trifluoro-2-iodoethane instead of using nonafluorobutyl iodide.

$H^1$—NHM (CDCl$_3$ 500 MHz, ppm)
1.31 (1, m), 1.50-1.56 (2, m), 1.75 (1, m), 2.13 (1, sex), 2.58 (1, m), 2.84 (1, m), 4.41-4.46 (3, m), 4.66 (1, dd), 6.05 (2, dd), 7.07 (2, d), 7.94 (2, d)

Preparation Example 9

Synthesis of bicyclo[2.2.1]hept-5-en-2-ylmethyl 3,5-bis(trifluoromethyl)benzoate A compound of Preparation Example 9 was obtained by the same method as Preparation Example 3 above except for using the same mol of 3,5-bis(trifluoromethyl)benzoic acid instead of using 4-(trifluoromethoxy)benzoic acid.

$H^1$-NHM (CDCl$_3$ 500 MHz, ppm)
1.31 (1, m), 1.50-1.56 (2, m), 1.75 (1, m), 2.13 (1, sex), 2.58 (1, m), 2.84 (1, m), 4.41 (1, dd), 4.66 (1, dd), 6.05 (2, dd), 8.12-8.14 (3, m)

Preparation Example 10

Synthesis of bicyclo[2.2.1]hept-5-en-2-ylmethyl 4-fluoro-3-(trifluoromethyl)benzoate A compound of Preparation Example 10 was obtained by the same method as Preparation Example 3 above except for using the same mol of 4-fluoro-3-(trifluoromethyl)benzoic acid instead of using 4-(trifluoromethoxy)benzoic acid.

$H^1$-NHM (CDCl$_3$ 500 MHz, ppm)
1.31 (1, m), 1.50-1.56 (2, m), 1.75 (1, m), 2.13 (1, sex), 2.58 (1, m), 2.84 (1, m), 4.41 (1, dd), 4.66 (1, dd), 6.05 (2, dd), 7.24 (1, t), 7.99 (1, m), 8.12 (1, d)

Preparation Example 11

Synthesis of 2,3,4-trifluorophenyl bicyclo[2.2.1]hept-5-ene-2-carboxylate

A compound of Preparation Example 11 was obtained by the same method as Preparation Example 1 above except for using the same mol of 2,3,4-trifluorophenol instead of using 3-hydroxybenzotifluoride.

$H^1$-NHM (CDCl$_3$ 500 MHz, ppm)
1.50 (1, m), 1.74-1.75 (2, m), 1.99 (1, m), 2.37 (1, m), 2.84 (1, m), 3.69 (1, m), 6.05 (2, dd), 6.88-6.95 (2, m)

Preparation Example 12

Synthesis of perfluorophenyl bicyclo[2.2.1]hept-5-ene-2-carboxylate

A compound of Preparation Example 12 was obtained by the same method as Preparation Example 1 above except for using the same mol of pentafluorophenol instead of using 3-hydroxybenzotifluoride.

$H^1$-NHM (CDCl$_3$ 500 MHz, ppm)
1.50 (1, m), 1.74-1.75 (2, m), 1.99 (1, m), 2.37 (1, m), 2.84 (1, m), 3.69 (1, m), 6.05 (2, dd)

Comparative Preparation Example 1

Synthesis of Cholestrerol-norbornene

A compound of Comparative Preparation Example 1 was obtained by the same method as Preparation Example 1 above except for using the same mol of cholesterol instead of using 3-hydroxybenzotifluoride.

$H^1$-NHM (CDCl$_3$ 500 MHz, ppm)
0.84 (3, s), 0.88 (3, d), 0.91 (6, d), 10.1 (3, s), 1.04-2.37 (32, m), 2.84 (1, m), 3.69 (1, m), 4.60 (1, quin), 5.27 (1, t), 6.05 (2, dd)

Preparation of Alignment Copolymer

Preparation Example 1-1

The monomer prepared in Preparative Example 1 (50 mmol) and 400 parts by weight of purified toluene based on 100 parts by weight of the monomer were added to a 250 ml Schlenk flask, and 1-octene (10 mmol) was added thereto.

A temperature of the mixture was raised to 90° C. while stirring the mixture. Then, as the catalyst, Pd(OAc)$_2$ (16 μmol) dissolved in dichloromethane (1 ml), tricyclohexylphosphine (32 μmol) and dimethylanilinium tetrakispentafluorophenyl borate (32 μmol) as the cocatalyst were added thereto, and stirred and reacted at 90° C. for 16 hours.

After the reaction was completed, an excessive amount of ethanol was added to obtain a white polymer precipitate.

The precipitate was recovered by using a glass funnel and dried in a vacuum oven at 60° C. for 24 hours, thereby obtaining a polymer. (Mw=151,000, PDI=2.31. yield=74%)

In addition, respective polymers shown in Table 1 were obtained by the same method as Preparation Example 1-1 above except for compositions summarized in the following Table 1, respectively.

TABLE 1

| Note | Monomer | Mw (g/mol) | PDI | yield (%) |
|---|---|---|---|---|
| Preparation Example 1-1 | Preparation Example 1 | 151,000 | 2.31 | 74 |
| Preparation Example 2-2 | Preparation Example 2 | 168,000 | 3.11 | 67 |
| Preparation Example 3-1 | Preparation Example 3 | 183,000 | 2.34 | 71 |
| Preparation Example 4-4 | Preparation Example 4 | 139,000 | 2.39 | 66 |
| Preparation Example 5-1 | Preparation Example 5 | 147,000 | 2.48 | 81 |

TABLE 1-continued

| Note | Monomer | Mw (g/mol) | PDI | yield (%) |
|---|---|---|---|---|
| Preparation Example 6-1 | Preparation Example 6 | 177,000 | 2.32 | 71 |
| Preparation Example 7-1 | Preparation Example 7 | 149,000 | 2.97 | 54 |
| Preparation Example 8-1 | Preparation Example 8 | 142,000 | 2.42 | 72 |
| Preparation Example 9-1 | Preparation Example 9 | 165,000 | 2.43 | 71 |
| Preparation Example 10-1 | Preparation Example 10 | 143,000 | 3.38 | 57 |
| Preparation Example 11-1 | Preparation Example 11 | 159,000 | 2.99 | 57 |
| Preparation Example 12-1 | Preparation Example 12 | 161,000 | 2.10 | 80 |
| Preparation Example 1-3 | Preparation Example 1 Preparation Example 3 Copolymerization | 142,000 | 2.38 | 69 |
| Preparation Example 3-4 | Preparation Example 3 Preparation Example 4 Copolymerization | 178,000 | 3.01 | 72 |
| Preparation Example 4-5 | Preparation Example 4 Preparation Example 6 Copolymerization | 175,000 | 2.67 | 65 |
| Preparation Example 6-10 | Preparation Example 6 Preparation Example 10 Copolymerization | 168,000 | 2.36 | 77 |
| Preparation Example 6-11 | Preparation Example 6 Preparation Example 11 Copolymerization | 165,000 | 2.72 | 74 |
| Comparative Example 1 | Comparative Preparation Example 1 | 173,000 | 2.21 | 68 |

Manufacture of Alignment Layer and Film

Example 1-1 to Example 6-11, and Comparative Example 1

The alignment copolymer according to Preparation Example was dissolved in cyclopentanone so as to have an amount of 3 wt %, and the obtained solution was spin-coated onto an ITO substrate (1.1 t).

The resulting material was dried at 100° C. for 2 minutes, a sealant (epoxy resin) was applied at the edge of the ITO substrate onto which the alignment layer was coated. Then, another ITO substrate onto which the alignment layer was coated was overlapped therewith, and compressed. The compressed substrates were irradiated with UV (100 mW/cm$^2$). Here, for exposure, a high-pressure mercury lamp having an intensity of 100 mW/cm$^2$ was used as a light source, and an amount of UV light was adjusted with time.

Two sheets of compressed ITO substrates were immersed in the liquid crystals in a vacuum state so as to inject the liquid crystal, and an injection unit of the liquid crystal was sealed by the sealant, followed by heat treatment at 90° C. for 20 minutes, thereby completing a liquid crystal cell.

Experimental Example

Evaluation of Alignment

Light leakage degree was measured by putting each of the manufactured cells between two polarizers that were vertically disposed, transmitting an incident light through the polarizers and the cell, and observing an amount of the transmitted light by a polarization microscope.

In addition, unlike a horizontal alignment layer in which the amount of transmitted light is maximum when being rotated at an angle of 45 degrees, the liquid crystal was vertically aligned in the vertical alignment layer, such that a light transmission phenomenon due to rotation was not shown, but there was a phenomenon that light was refracted and transmitted due to the liquid crystal when being tilted, and therefore, whether the light was uniformly transmitted after being tilted was evaluated.

The light leakage degree was evaluated based on a 10 point scale, and results thereof were summarized in the following Table.

(10: Disclination did not occur, 1: Disclination occurred and No alignment)

TABLE 2

| Note (Copolymer) | Alignment after liquid crystal injection | Alignment at 95° C. (Temperature over $T_{NI}$) |
|---|---|---|
| Example 3-1 (Preparation Example 3-1) | 10 | 9 |
| Example 3-4 (Preparation Example 3-4) | 10 | 10 |
| Example 4-5 (Preparation Example 4-5) | 10 | 10 |
| Comparative Example 1 (Comparative Example 1) | 10 | 1 |

TABLE 3

| Note (Copolymer) | Alignment (0 degree) | 45 degree-rotation alignment (45 degrees) | 45 degree-rotation and tilt alignment (45 degrees) |
|---|---|---|---|
| Example 3-4 (Preparation Example 3-4) | 10 | 0 | 10 |

Referring to Table 2 and 3 above, it could be confirmed that in Comparative Example, alignment after the liquid crystal injection was excellent, but alignment was rarely maintained at a temperature over $T_{NI}$.

However, it could be confirmed that in Example of the present invention, alignment was significantly and excellently maintained not only after the liquid crystal injection but also at a temperature over $T_{NI}$.

Further, it could be confirmed that due to the characteristic of the vertical alignment layer, the 45 degree-rotation alignment was not shown, but excellent alignment was shown by the tilt.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: Substrate

200: Vertical alignment layer

300: Liquid crystal layer

What is claimed is:

1. A vertical alignment layer comprising:
a cyclic olefin copolymer of a monomer represented by Chemical Formula 1 below:

[Chemical Formula 1]

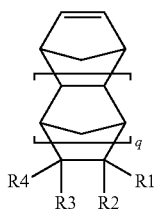

in Chemical Formula 1,
q is an integer of 0 to 4,
at least one of R1 to R4 is a radical represented by Chemical Formula 1a below,
remaining R1 to R4 except for the radical represented by Chemical Formula 1a below are the same as each other or different from each other, and are each independently selected from the group consisting of hydrogen; halogen; substituted or unsubstituted C1-C20 linear or branched alkyl; substituted or unsubstituted C2-C20 linear or branched alkenyl; substituted or unsubstituted C2-C20 linear or branched alkynyl; substituted or unsubstituted C3-C12 cycloalkyl; substituted or unsubstituted C6-C40 aryl; substituted or unsubstituted C5-C12 arylalkyl; and a polar functional group including at least one selected from oxygen, nitrogen, phosphorus, sulfur, silicon, and boron, and
when R1 to R4 are not hydrogen; halogen; or the polar functional group, at least one combination of R1 and R2 or R3 and R4 may be linked to each other to form a C1-C10 alkylidene group, or R1 or R2 may be linked to any one of R3 and R4 to form a C4-C12 saturated or unsaturated aliphatic ring, or a C6-C24 aromatic ring,

[Chemical Formula 1a]

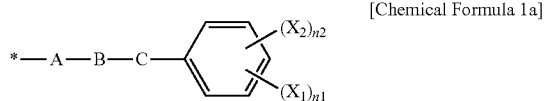

in Chemical Formula 1a,
A and C are each independently a simple bond, or substituted or unsubstituted C1-C5 alkylene,
B is ester,
n1 and n2 are each independently an integer of 0 to 5, and n1+n2 are an integer of 1 to 5, and
$X_1$ and $X_2$ are substituents substituted in a benzene ring, and each independently a fluorine atom (F), C1-C5 fluorinated alkyl, C1-C5 fluorinated alkoxy, C6-C20 fluorinated aryl, or C6-C20 fluorinated alkoxyaryl.

2. The vertical alignment layer of claim 1, wherein:
the polar functional group including at least one selected from oxygen, nitrogen, phosphorus, sulfur, silicon, and boron is selected from the group consisting of functional groups to be listed below:
—$OR_6$, —$OC(O)OR_6$, —$R_5OC(O)OR_6$, —$C(O)OR_6$, —$R_5C(O)R_6$, —$C(O)R_6$, —$R_5C(O)R_6$—, —$OC(O)R_6$, —$(R_5O)R_6$, —$(R_5O)_pOR_6$, —$OR_{5p}$—$OR_6$, —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$—, —$R_5C(=S)SR_6$, —$R_5SO_3R_6$, —$SO_3R_6$, —$R_5N=C=S$, —$N=C=S$, —$NCO$, —$R_5$—$NCO$, —$CN$, —$R_5CN$, —$NNC(=S)R_6$, —$R_5NNC(=S)R_6$, —$NO_2$, —$R_5NO_2$,

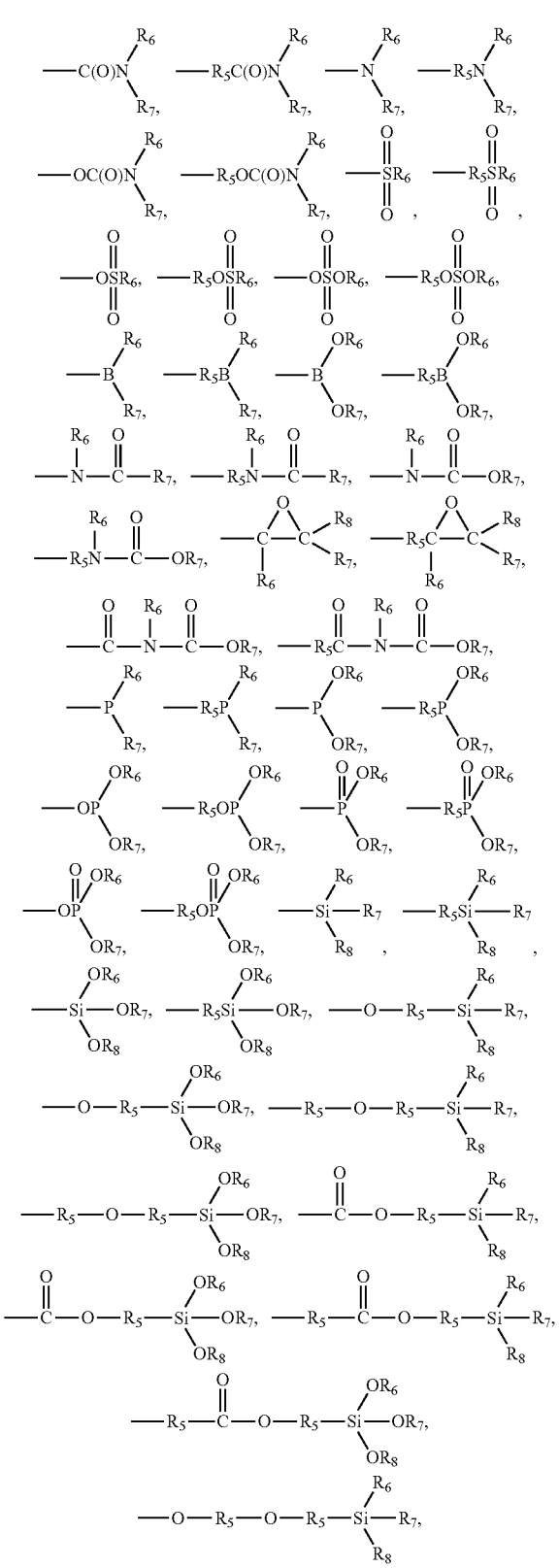

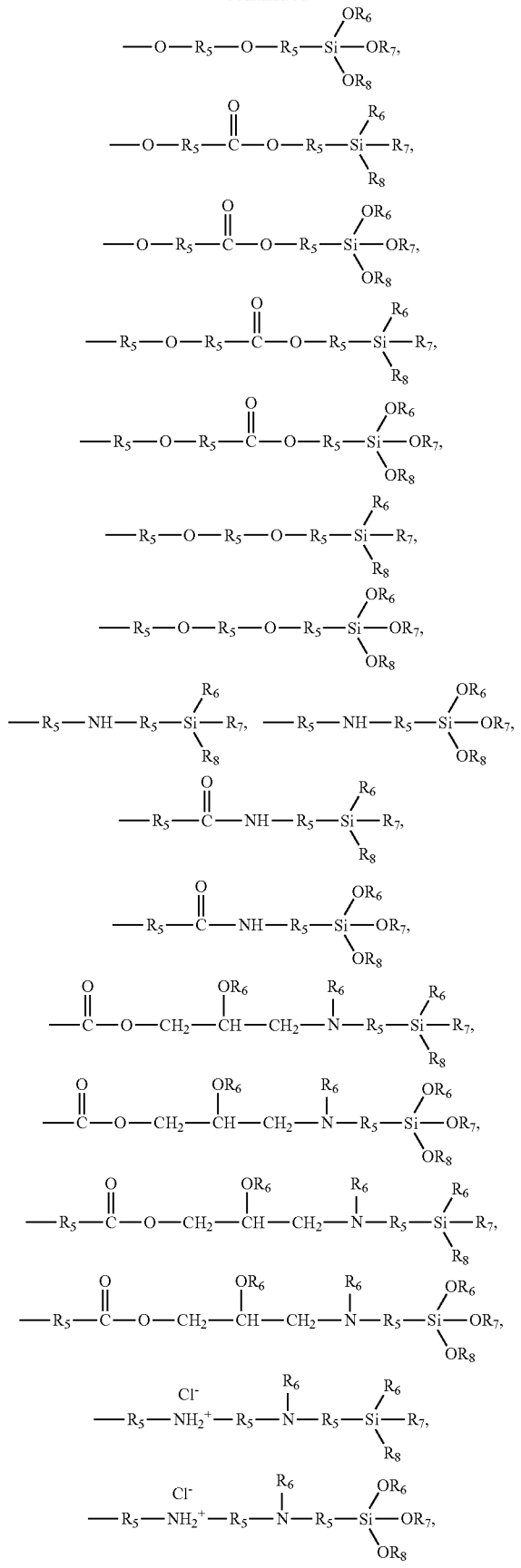

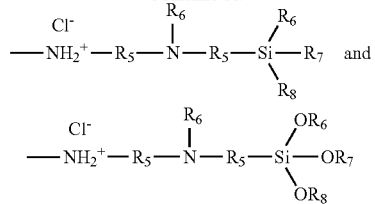

in the polar functional group, p is each independently an integer of 1 to 10,

R$_5$ is substituted or unsubstituted C1-C20 linear or branched alkylene; substituted or unsubstituted C2-C20 linear or branched alkenylene; substituted or unsubstituted C2-C20 linear or branched alkynylene; substituted or unsubstituted C3-C12 cycloalkylene; substituted or unsubstituted C6-C40 arylene; substituted or unsubstituted C1-C20 carbonyloxylene; or substituted or unsubstituted C1-C20 alkoxylene, and R$_6$, R$_7$ and R$_8$ are each independently selected from the group consisting of hydrogen; halogen; substituted or unsubstituted C1-C20 linear or branched alkyl; substituted or unsubstituted C2-C20 linear or branched alkenyl; substituted or unsubstituted C2-C20 linear or branched alkynyl; substituted or unsubstituted C3-C12 cycloalkyl; substituted or unsubstituted C6-C40 aryl; substituted or unsubstituted C1-C20 alkoxy; and substituted or unsubstituted C1-C20 carbonyloxy.

3. The vertical alignment layer of claim 2, wherein:
each functional group of R$_5$ to R$_8$ is unsubstituted or substituted with a functional group selected from the group consisting of halogen, alkyl, alkenyl, alkynyl, haloalkyl, haloalkenyl, haloalkynyl, aryl, haloaryl, arylalkyl, haloarylalkyl, alkoxy, haloalkoxy, carbonyloxy, halocarbonyloxy, aryloxy, haloaryloxy, silyl and siloxy.

4. The vertical alignment layer of claim 1, wherein:
the copolymer is an alignment copolymer including a repeating unit represented by Chemical Formula 2a or 2b below:

[Chemical Formula 2a]

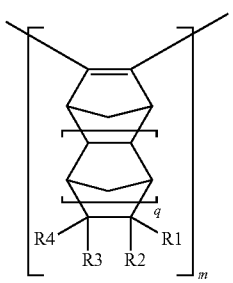

[Chemical Formula 2b]

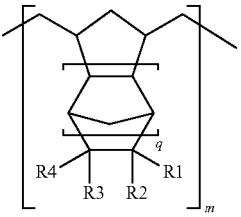

in Chemical Formulas 2a and 2b, each independently,
m is 50 to 5000,
q is an integer of 0 to 4, at least one of R1 to R4 is a radical represented by Chemical Formula 1a below, remaining R1 to R4 except for the radical represented by Chemical Formula 1a below are the same as each other or different from each other, and are each independently selected from the group consisting of hydrogen; halogen; substituted or unsubstituted C1-C20 linear or branched alkyl; substituted or unsubstituted C2-C20 linear or branched alkenyl; substituted or unsubstituted C2-C20 linear or branched alkynyl; substituted or unsubstituted C3-C12 cycloalkyl; substituted or unsubstituted C6-C40 aryl; substituted or unsubstituted C5-C12 arylalkyl; and a polar functional group including at least one selected from oxygen, nitrogen, phosphorus, sulfur, silicon, and boron, and when R1 to R4 are not hydrogen; halogen; or the polar functional group, at least one combination of R1 and R2 or R3 and R4 may be linked to each other to form a C1-C10 alkylidene group, or R1 or R2 may be linked to any one of R3 and R4 to form a C4-C12 saturated or unsaturated aliphatic ring, or a C6-C24 aromatic ring,

[Chemical Formula 1a]

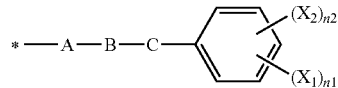

in Chemical Formula 1a,

A and C are each independently a simple bond, or substituted or unsubstituted C1-C5 alkylene, B is ester, n1 and n2 are each independently an integer of 0 to 5, and n1+n2 are an integer of 1 to 5, and $X_1$ and $X_2$ are substituents substituted in a benzene ring, and each independently a fluorine atom (F), C1-C5 fluorinated alkyl, C1-C5 fluorinated alkoxy, C6-C20 fluorinated aryl, or C6-C20 fluorinated alkoxyaryl.

5. A liquid crystal cell comprising the vertical alignment layer of claim 1 and a liquid crystal layer.

6. A display device comprising the vertical alignment layer of claim 1.

* * * * *